United States Patent Office 3,492,335
Patented Jan. 27, 1970

3,492,335
ALKOXY-ALKOXYPHENYL-N-METHYL-CARBAMATES
Kurt Gubler, Riehen, Switzerland, assignor to Geigy Chemical Corporation, Greenburgh, N.Y., a corporation of Delaware
No Drawing. Filed June 20, 1966, Ser. No. 558,557
Claims priority, application Switzerland, June 25, 1965, 8,940/65
Int. Cl. C07c 125/06; A01n 9/20
U.S. Cl. 260—479                                    4 Claims

ABSTRACT OF THE DISCLOSURE

Carbamic acid esters having the structure

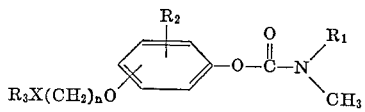

in which $R_1$ is hydrogen or methyl; $R_2$ is hydrogen, halogen, nitro, $C_{1-4}$ alkyl, or $C_{1-4}$ alkoxy; $R_3$ is $C_{1-4}$ alkyl, or halogenated $C_{2-4}$ alkyl; $X$ is oxygen or sulfur; and $n$ represents the number 1 or 2. These compounds are useful to control insects and spiders.

---

The present invention relates to carbamic acid esters, pest control agents which contain these new carbamic acid esters as active ingredients, as well as a method for combatting pests, particularly insects and spiders by applying the new active ingredients or agents containing them to sites infested with and/or to be protected against such pests.

More particularly, in a first aspect, the invention concerns new carbamic acid esters of the formula

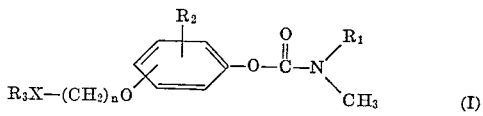

wherein:

$R_1$ represents hydrogen or the methyl radical,
$R_2$ represents hydrogen, a halogen atom, the nitro group or an alkyl or alkoxy radical, having from 1 to 4 carbon atoms,
$R_3$ represents an alkyl radical having from 1 to 4 carbon atoms or a halogenated alkyl radical having from 2 to 4 carbon atoms,
$X$ represents oxygen or sulfur, and
$n$ represents the number 1 or 2, which substances have good to very good action as contact and stomach poisons against insects and spiders, combined with a marked systemic action.

It has also been found that the active substances of Formula I have particularly outstanding, protracted action on insects of the families Muscidae, Stomoxidae and Culicidae, e.g. on the polyvalent resistant and normally sensitive house flies (*Musca domestica*), stable flies (*Stomoxys calcitrans*) and mosquitoes (*Aedes aegyptii, Culex fatigans, Anopheles staphensi*), on insects of the families Curculionidae, Bruchidae, Dermestidae, Tenebrionidae and Chrysonelidae, e.g. granary weevils (*Sitophilus granarius*), bean beetles (*Bruchidius obtectus*), larder beetles (*Dermestes vulpinus*), yellow meal worms (*Tenebrio molitor*), Colorado potato beetles (*Leptinotarsa decemlineata*) and their stages of development, on the Pyralididae family, e.g. Mediterranean flour moths (*Ephestia kühniella*), the Blattidae family, e.g. German cockroaches (*Phyllodromia germanica*), the Aphididae family, e.g. bean aphids (*Aphis fabae*) and the Pseudococcidae family, e.g. citrus mealybugs (*Planococcus citri*).

Tests on bean aphids (*Aphis fabae*) and desert locusts (*Schistocerca gregaria*) indicate that the substances have an excellent systemic action. Thus, active substances of the general Formula I can be used both as insecticides in plant protection and also as insecticides for the protection of warm blooded animals and household stores.

In addition, the active substances have a good action on the larval and adult stages of spiders, e.g. of the families Tetranychidae, Ixodidae, Argasidae.

Application of the active ingredients in the most various forms for use, e.g. as dusts, wettable powders, emulsions or oil solutions, gives good results against the insects and spiders mentioned above. The maximal activity of the active ingredients is attained when they are in the form of coatings the adhesion of which to the surface to be protected is very slight.

The range of action of the active ingredients mentioned is widened by admixture with synergists and other auxiliaries having a similar action such as succinic acid dibutyl ester, piperonyl butoxide, olive oil, peanut oil etc., and the insecticidal and acaricidal action is improved.

In the same way, the insecticidal action can be improved and broadened and adapted to given external conditions by the addition of other insecticides such as phosphoric, phosphonic, thiophosphoric and dithiophosphoric acid esters and amides, other carbamic acid esters, halogen hydrocarbons, DDT analogues, pyrethrines and synergists thereof, etc.

To promote contact with pests, the active ingredients can be used in admixture with attractants or baits such as sugar and honey, or they can be brought onto sugar and similar materials. In addition, the active substances of general Formula I can be mixed and applied with substances having bactericidal, fungicidal or nematocidal properties in order to increase the breadth of the biological activity.

The new carbamic acid esters of general formula I are stable to water and dissolve well in the usual organic solvents. Preferred particularly active compounds are those carbamic acid esters of general Formula I, wherein $R_2$ is hydrogen, $R_3$ is the methyl or ethyl radical, X is oxygen and $n$ is the integer 1 and wherein the substituent $$R_3-X-(CH_2)_n-O-$$

is in the o- or m-position to the carbamyl radical.

The compounds of Formula I the properties of which have been described hereinbefore are obtained according to the invention by reacting a divalent phenol of the general Formula II:

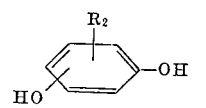

wherein $R_2$ has the meaning given in Formula I, or a salt thereof with inorganic and organic bases, in any order desired with (a) a halogenalkyl compound of the general Formula III $$Hal-(CH_2)_n-X-R_3 \quad (III)$$

wherein $R_3$, $X$ and $n$ have the meanings given in Formula I, and Hal represents a halogen atom, preferably chlorine and (b) either a N-monomethyl or N,N-dimethyl carbamic acid halide of the general Formula IV

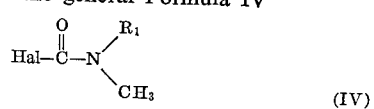

wherein $R_1$ and Hal have the meanings given in Formulae I and III, or with methylisocyanate $CH_3NCO$ which may be produced from a monomethyl carbamic acid halide of the general Formula IV by splitting off hydrogen halide, the reaction being performed in the presence of an acid binding agent.

In particular, tertiary amines such as pyridine and trialkylamines, inorganic bases, e.g. the hydroxides and carbonates of alkali and alkaline earth metals are used as acid binding agents.

The carbamic acid halides of the general Formula IV serving as starting compounds and reacting with divalent phenols of the general Formula II may also be formed in situ in the reaction mixture from their components, phosgene and an alkyl or dialkyl amine. On reacting phosgene with the divalent phenol of Formula II, in certain cases first a polymerisate may be obtained which, with the alkylamine added leads to the intermediate products of general Formula V:

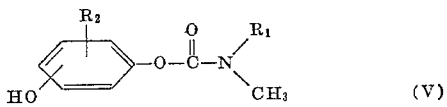

wherein $R_1$ and $R_2$ have the meanings given above. These intermediate products are then reacted with a halogen alkyl derivative of general Formula III to form the esters of general Formula I. The phenols of general Formula V can also be obtained by reacting a corresponding O-hydroxyphenyl-O-alkyl carbonic acid ester with an alkylamine or dialkylamine.

The monomethyl carbamic acid esters of general Formula I may also be obtained by using, instead of a corresponding monomethyl carbamic acid halide of general Formula IV, or of the methyl isocyanate, a mixture of both compounds. The following can be used, for example, as the initial divalent phenols of Formula II: pyrocatechol, resorcinol, hydroquinone or 3 - methoxypyrocatechol, which can be substituted by an alkyl or nitro group or by halogen. The following ethers, e.g. are used as halogen alkyl derivatives of the general Formula III: α-chlorodimethyl ether, α-chloromethyl-β-chloroethyl ether, α-chloromethyl-n-propyl ether, α-chloromethyl-isopropyl ether, β-chloroethyl-n-propyl ether and -isopropyl ether.

The reactions according to the invention are advantageously performed in the presence of solvents which are inert to the reaction components and in the presence of a proton acceptor. Aromatic hydrocarbons such as benzene, toluene, xylene, etc. as well as chlorinated hydrocarbons such as chloroform, chlorobenzene, also amides, e.g. dimethyl formamide, and ketones are used as solvents. Suitable proton acceptors are inorganic bases such as the hydroxides and carbonates of alkali and alkaline earth metals, and organic nitrogen bases, e.g. tertiary amines such as pyridine, triethylamine, triethylenediamine, etc.

The invention is further illustrated by the following non-limitative examples. Where not expressly stated otherwise, parts and percentages are given by weight. The temperatures are in degrees centigrade.

EXAMPLE 1

(a) 44 parts of pyrocatechin are dissolved in 500 parts by volume of benzene and 37.4 parts of methyl carbamic acid chloride are added. The reaction mixture is refluxed for 5 hours. After cooling, the benzene solution is extracted three times with 100 parts by volume of ice cold, aqueous 2 N sodium hydroxide solution each time, and the NaOH extracts are added to 400 parts by volume of ice cooled 2 N aqueous hydrochloric acid. The 2-hydroxyphenyl-N-methyl-carbamate precipitates in crystalline form. It is filtered off under suction, washed neutral and dried over $H_2SO_4$ in a desiccator at 50–60°. After recrystallising from ether, the ester melts at 126–127.5°.

(b) A solution of 95 parts of 2-hydroxyphenyl-N-methyl-carbamate in 400 parts by volume of abs. ethanol is cooled to 0 to —5° and, while stirring a solution of 30.4 parts of sodium methylate in 200 parts by volume of abs. ethanol is added dropwise. Then 45.6 parts of α-chlorodimethyl ether are added dropwise to this reaction mixture at 0 to —5° whereupon the mixture is stirred for 12 hours. The alcohol is then distilled off in vacuo at 50° and the residue is recrystallised from ether. The 2-(methoxy-methoxy)-phenyl-N-methyl-carbamate melts at 95–97°.

EXAMPLE 2

(a) 40.0 parts of chlorodimethyl ether are added dropwise during 30 minutes at 20° to a solution of 55 parts of resorcinol and 50.5 parts of triethylamine in 300 parts by volume of dimethoxy ethane. The reaction mixture is stirred for 8 hours at 60–70°. The triethylamine hydrochloride which precipitates is separated by filtration and the filtrate is evaporated in vacuo to dryness. The residue is distilled in vacuo and the resulting 3-(methoxy-methoxy) phenol boils at 102–105°/0.02 mm. Hg.

(b) 15.4 parts of 3-(methoxy-methoxy)-phenol, 1 part by volume of triethylamine, 6 parts of methyl isocyanate and 50 parts by volume of benzene are heated at 45–50° for 24 hours in a bomb tube. The benzene is then evaporated and the residue is recrystallised from ether. The 3-(methoxy-methoxy)-phenyl-N-methyl-carbamate has a melting point of 63–67°.

On using equivalent amounts of the corresponding starting materials, the following compounds are obtained in the manner described in Examples 1 and 2.

| Compounds: | M.P. or B.P. |
|---|---|
| 2 - (methoxy - methoxy)-phenyl-N,N-dimethyl-carbamate | 124°/0.05 mm. Hg. |
| 2 - (ethoxy - methoxy)-phenyl-N-methyl-carbamate | 79–82°. |
| 2 - (ethoxy-methoxy)-phenyl-N,N-dimethyl-carbamate | 116–119°/0.05 mm. Hg. |
| 2 - (β - chlorethoxy-methoxy)-phenyl-N-methyl-carbamate | 97.5–100°. |
| 2 - (sec.butoxy-methoxy) - phenyl-N-methyl-carbamate | 83.5–87°. |
| 2 - (isopropoxy-methoxy)-phenyl-N-methyl-carbamate | Oily. |
| 2 - (methoxy - methoxy)-x-chlorophenyl-N-methyl-carbamate | Oily. |
| 3 - (ethoxy - methoxy)-phenyl-N-methyl-carbamate | 39–42°. |
| 4 - (methoxy-methoxy)-phenyl-N-methyl-carbamate | 77.5–80.5°. |
| 2 - (methylthio - methoxy)-phenyl-N-methyl-carbamate | |
| 3 - (methylthio - methoxy)-phenyl-N-methyl-carbamate | |
| 2 - (methoxy - methoxy)-4-nitrophenyl-N-methyl-carbamate | |
| 2 - (methoxy - methoxy)-5-nitrophenyl-N-methyl-carbamate | |
| 2 - (methoxy-methoxy)-6-methoxyphenyl-N-methyl-carbamate | |
| 3 - (methoxy-methoxy)-4-isopropylphenyl-N-methyl-carbamate | |
| 2-methyl - 3 - (methoxy-methoxy)-phenyl-N-methyl-carbamate | |
| 2 - (β-chloroethoxy-methoxy)-phenyl-N-methyl-carbamate | |

A second aspect of the invention concerns pest control agents containing a compound of Formula I as pesticidally active ingredient, and method of controlling pests by means of compounds or pest control agents according to the invention.

Pest control agents according to the invention are produced by intimately mixing and milling the active substances of Formula I with suitable carriers, optionally with the addition of dispersing agents or solvents which are inert to the active substances. These pest control agents are preferably used in the following forms:

Solid forms: dusts, sprinkling agents, granulates (coated granules, impregnated granules, homogeneous granules);
Water dispersible concentrates of active substances: wettable powders, pastes, emulsions;
Liquid forms: solutions, aerosols.

The concentration of active substance in these agents is 0.01–80%. The agents according to the invention can be admixed with other biocidally active substances. Thus, in addition to the compounds mentioned of general Formula I, the new agents can contain, e.g. other insecticides, fungicides, bactericides, fungistatics, bacteriostatics or nematocides to widen the range of action. The agents according to the invention can also contain fertilisers, trace elements, etc.

To increase the stability of the active substances, it is of advantage, in the case of preparations which are to be diluted with water or contain water as solvent, either to admix or to add on diluting or dispersing, additives which regulate the pH, for example inorganic or organic acids.

The following forms of such agents serve to illustrate the present invention; where not otherwise expressly stated, parts are given as parts by weight.

DUSTS

To produce (a) a 10% and (b) a 2% dust, the following substances are used:

|  | Parts |
|---|---|
| (a) 2 - (ethoxy - methoxy)-phenyl-N-methyl-carbamate | 10 |
| Highly dispersed silicic acid | 5 |
| Talcum | 85 |
| (b) 4 - (methoxy - methoxy)-phenyl-N-methyl-carbamate | 2 |
| Highly dispersed silicic acid | 1 |
| Talcum | 97 |

The active substances are mixed and milled with the carriers. The dusts obtained can be used, for example for combatting German cockroaches and ants, etc. in houses and also, however, for plant protection.

GRANULATE

To produce a 5% granulate, the following substances are used:

|  | Parts |
|---|---|
| 3 - (methoxy - methoxy)-phenyl-N-methyl-carbamate | 5 |
| Epichlorohydrin | 0.25 |
| Cetyl polyglycol ether | 0.25 |
| Polyglycol ("Carbowax") | 3.50 |
| Kaolin (particle size 0.3–0.8 mm.) | 91 |

The active substance is mixed with epichlorohydrin and dissolved with 6 parts of acetone whereupon the polyglycol and cetyl polyglycol ether are added. The solution obtained is sprayed onto kaolin and finally the acetone is evaporated off in vacuo. The granulate obtained is suitable for the protection of plants and stores.

WETTABLE POWDERS

To produce (a) and (b) a 50%, (c) a 25% and (d) a 10% wettable powder, the following components are used:

|  | Parts |
|---|---|
| (a) 2 - (methoxy - methoxy)-phenyl-N-methyl-carbamate | 50 |
| Naphthalene sulphonic acid-benzene sulphonic acid-formaldehyde condensate | 5 |
| Alkyl-aryl sulphonate ("Tinovetin B") | 5 |
| Champagne chalk | 5 |
| Silicic acid | 20 |
| Kaolin | 15 |
| (b) 2 - (isopropoxy - methoxy)-phenyl-N-methyl-carbamate | 50 |
| Alkylaryl sulphonate ("Tinovetin B") | 5 |
| Calcium-lignin sulphonate | 10 |
| Champagne chalk-hydroxyethyl cellulose mixture (1:1) | 1 |
| Silicic acid | 20 |
| Kaolin | 14 |
| (c) 2 - (β-chlorethoxy - methoxy) - phenyl-N-methyl-carbamate | 25 |
| Sodium salt of oleyl methyl tauride | 5 |
| Naphthalene sulphonic acid-formaldehyde condensate | 2.5 |
| Carboxymethyl cellulose | 0.5 |
| Neutral potassium-aluminuim silicate | 5 |
| Kaolin | 62 |
| (d) 2 - (ethoxy - methoxy) - phenyl - N - methyl - carbamate | 10 |
| A mixture of the sodium salts of saturated fatty alcohol sulphates | 3 |
| Naphthalene sulphonic acid-formaldehyde condensate | 5 |
| Kaolin | 82 |

The active substances are intimately mixed with the additives in suitable mixing machines and the mixture is milled in suitable mills and drums. Wettable powders are obtained which can be diluted with water to form suspensions of any desired concentration. Such suspensions are mainly used in plant protection for combatting biting and sucking insects.

PASTE

To produce a 45% paste, the following substances are used:

|  | Parts |
|---|---|
| 2 - (sec. - butoxy - methoxy) - phenyl - N - methyl - carbamate | 45 |
| Sodium aluminium | 5 |
| Cetyl polyglycol ether ("Genapol O 080") | 14 |
| Cetyl polyglycol ether ("Genapol O 050") | 1 |
| Spindle oil | 2 |
| Polyglycol ("Carbowax") | 10 |
| Water | 23 |

The active substance is intimately mixed and milled with the additives in apparatus suitable therefor. A paste is obtained from which, by dilution with water, suspensions of any concentrations desired can be produced. These suspensions are mainly used in plant protection for the combatting of insects.

EMULSION

To produce a 10% emulsion concentrate:

|  | Parts |
|---|---|
| 3 - (methoxy - methoxy) - phenyl - N - methyl-carbamate | 10 |
| Xylene | 55 |
| Dimethyl formamide | 32 |
| A combination emulsifier (alkylaryl polyethylene glycol - alkylaryl sulphonate calcium salt) | 3 | are mixed together. This concentrate can be diluted with water to form emulsions of concentrations suitable for plant protection and the protection of stores.

SPRAY (a) 2 parts of 2-(ethoxy-methoxy)-phenyl-N-methyl-carbamate are dissolved in 98 parts of water.

(b) 2 parts of 4 - (methoxy - methoxy) - phenyl - N - methyl-carbamate are dissolved in 10 parts of xylene and 88 parts of petroleum.

(c) 2 parts of 2 - (isopropoxy - methoxy) - phenyl - N-methyl-carbamate and 3 parts of dichlorophenyltrichlorethane active substance are dissolved in 95 parts of kerosene.

These solutions are sprayed with pressure pumps. The solution (a) is used adaantageously for combatting leaf aphids on fruit trees. The solutions (b) and (c) are used in particular for combatting flies and midges in houses, storerooms and slaughterhouses.

I claim:
1. A carbamate of the formula

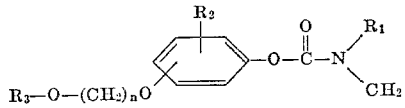

wherein:
$R_1$ represents hydrogen or methyl,
$R_2$ represents hydrogen, halogen, nitro, alkyl of from 1 to 4 carbon atoms, alkoxy of from 1 to 4 carbon atoms,
$R_3$ represents alkyl of from 1 to 4 carbon atoms or monochloro- and dichloroalkyl of from 2 to 4 carbon atoms,
$n$ represents one of the integers 1 and 2.

2. A compound as defined in claim 1, which is 2-(methoxy-methoxy)-phenyl-N-methyl-carbamate.
3. A compound as defined in claim 1, which is 2-(ethoxy-methoxy)-phenyl-N-methyl-carbamate.
4. A compound as defined in claim 1, which is 3-(methoxy-methoxy)-phenyl-N-methyl-carbamate.

References Cited

UNITED STATES PATENTS

| | | | |
|---|---|---|---|
| 3,352,815 | 11/1967 | Bencze | 167—30 XR |
| 2,776,197 | 1/1957 | Gysin et al. | 260—479 |
| 3,111,539 | 11/1963 | Bocker et al. | 260—479 |
| 3,304,225 | 2/1967 | Szabo et al. | 260—479 |

JAMES A. PATTEN, Primary Examiner

U.S. Cl. X.R.

260—609, 613, 999; 424—300

PO-1050
(5/69)

UNITED STATES PATENT OFFICE
CERTIFICATE OF CORRECTION

Patent No. 3,492,335                    Dated January 27, 1970

Inventor(s) Kurt Gubler

It is certified that error appears in the above-identified patent and that said Letters Patent are hereby corrected as shown below:

In column 7, that portion of the structural formula reading \\CH$_2$ should read \\CH$_3$.

In column 7, lines 14-15, "alkyl of from 1 4 carbon atoms" should read --alkyl of from 1 to 4 carbon atoms--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents